United States Patent [19]

Becker et al.

[11] 4,115,951

[45] Sep. 26, 1978

[54] APPARATUS FOR SUPPLYING FLUIDS TO POTTED PLANTS

[76] Inventors: Joseph T. Becker, 2 S. 214 Sheffield Rd., Glen Ellyn, Ill. 60137; Byron L. Doran, 1725 LaPalma Ct., Wheaton, Ill. 60187

[21] Appl. No.: 737,702

[22] Filed: Nov. 1, 1976

[51] Int. Cl.² ............. A01G 27/00; A01G 29/00
[52] U.S. Cl. .................................. 47/81; 47/48.5; 220/86 R
[58] Field of Search ............... 47/48.5, 79–81; 220/86 R, 254, 375; 222/187, 561, 566

[56] References Cited

U.S. PATENT DOCUMENTS

| D. 158,596 | 5/1950 | Lack | 47/48.5 |
|---|---|---|---|
| 1,400,628 | 12/1921 | Rudolph | 47/81 |
| 1,824,394 | 9/1931 | Crane | 222/561 X |
| 1,983,185 | 12/1934 | Novak | 220/86 R X |
| 2,701,078 | 2/1955 | Bowman | 222/561 X |
| 2,747,332 | 5/1956 | Morehouse | 47/81 |
| 2,799,121 | 7/1957 | Modeweg | 47/80 |
| 3,021,976 | 2/1962 | Tracy | 220/254 X |
| 3,069,807 | 12/1962 | Wall | 47/81 |
| 3,082,901 | 3/1963 | Nakagawa | 220/86 R X |

FOREIGN PATENT DOCUMENTS

| 1,061,015 | 4/1954 | France | 47/81 |
|---|---|---|---|
| 1,104,205 | 11/1955 | France | 47/48.5 |
| 2,447,230 | 4/1976 | Fed. Rep. of Germany | 47/80 |

Primary Examiner—Edgar S. Burr
Assistant Examiner—Steven A. Bratlie
Attorney, Agent, or Firm—James T. FitzGibbon

[57] ABSTRACT

A plant feeding apparatus for providing a continuous supply of liquid to the soil surrounding potted plants. The apparatus includes a fluid reservoir portion with a reservoir body and a cover assembly, and a soil probe portion with an axially extending, wick-receiving opening disposed therein. A soil moisturizing wick is provided which extends from the reservoir and into the opening in the probe. The soil probe is relatively rigid and includes a variable-area aperture in a part thereof for permitting at least a portion of the wick to be exposed through the aperture for moisturizing the soil received in a container. A neck or shoulder is found where the probe meets the reservoir body, and this shoulder facilitates mounting the apparatus on a rim of the pot or other receptacle. An adjustable slide serves to expose more or less wick through the aperture in the probe.

1 Claim, 6 Drawing Figures

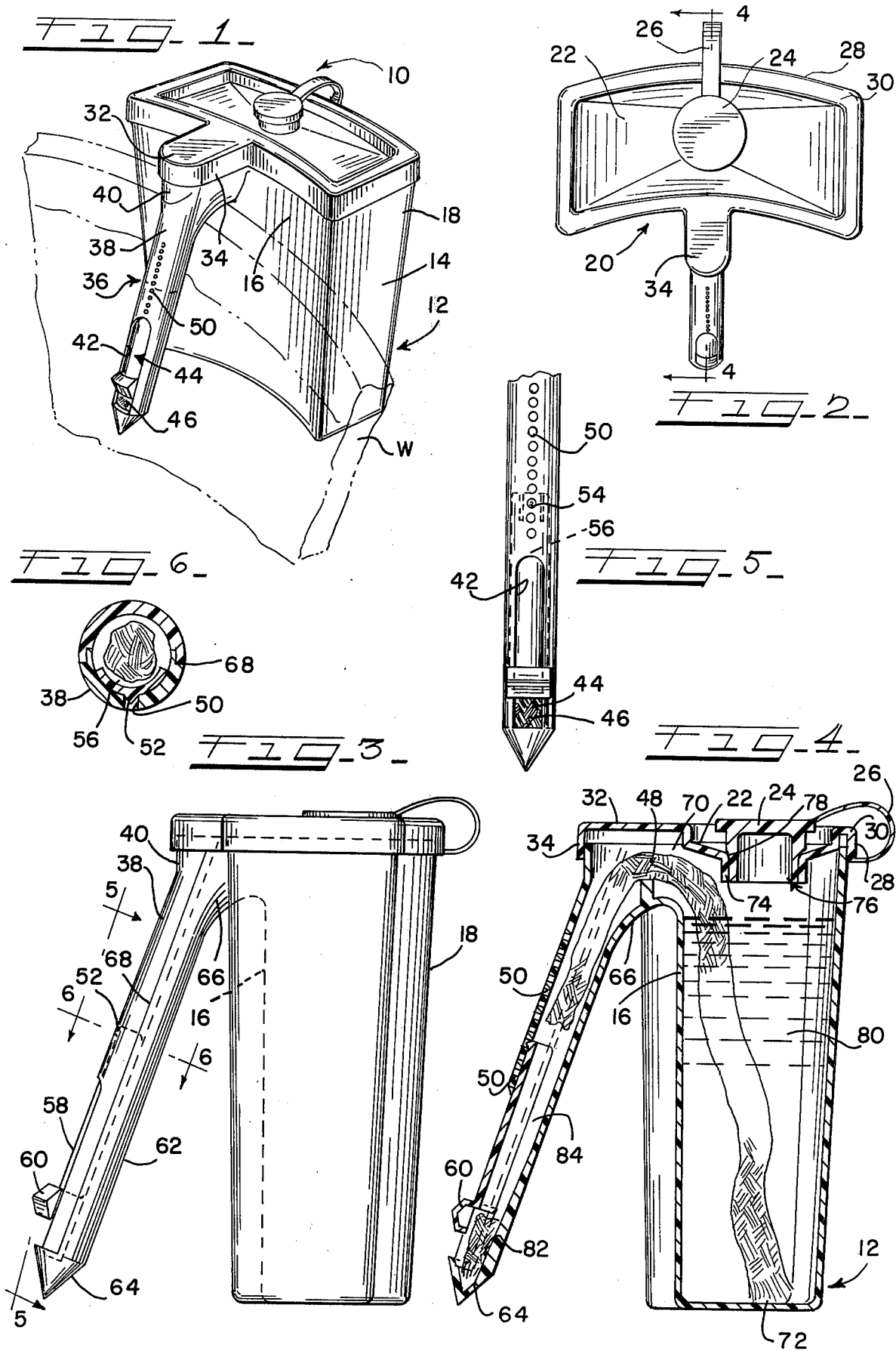

APPARATUS FOR SUPPLYING FLUIDS TO POTTED PLANTS

BACKGROUND OF THE INVENTION

The present invention relates generally to an apparatus for providing a continuous supply of water to the soil surrounding potted plants, or the like, and more particularly, to an improved and simplified form of such apparatus.

A number of devices are known which have as their general purpose the maintenance of an adequate water supply to potted plants. Some of these devices possess certain definite drawbacks and disadvantages, and even those devices which show a number of advantages are believed capable of future improvement. For example, there has been a need for a plant watering or tending device which can be attached to or associated in use with flowers or plants which are more or less permanently implanted or potted within their containers such as flower pots, window boxes or other plant holders.

The prior art shows a number of specially constructed pots and other receptacles which include water-receiving portions forming a part of the pot itself. However, using such devices, in the case of existing plants, would involve a transplanting operation. Moreover, such pots are expensive compared to ordinary flower pots and, of course, are capable of receiving only flowers or other plants of the size determined by the container.

Other prior art plant watering devices are capable of supplying moisture from a reservoir but do not include means for controlling the rate of moisture application, or are unduly cumbersome, present operational drawbacks in use, or are characterized by other disadvantages.

In view of the foregoing drawbacks and disadvantages of prior art plant watering devices, it is an object of the present invention to provide an improved watering device which can be removably associated with existing potted plants.

Another object is to provide a plant watering device which supplies moisture to the soil surrounding the plant only as needed, or as determined by an adjustment of the apparatus.

A further object is to provide a plant watering device which will not overmoisturize the soil or permit it to become unduly dried out.

Another object is to provide a watering device for potted plants which reduces total moisture loss, and which conserves moisture by reason of feeding moisture to the soil beneath its surface and keeping the top surface of the soil dry.

Another object is to provide a plant watering device which will reduce or eliminate rotting of the plant roots by feeding moisture to the soil surrounding the roots rather than applying liquid water directly to the roots.

Another object is to provide a plant watering device which facilitates addition of plant "foods" or fertilizers to the soil as the soil is moisturized.

Another object is to provide a plant tender which contains an easily refilled water supply which will last for one to three weeks or more.

Another object is to provide a plant watering device which may be capped or covered in air tight relation but which can be easily filled without spilling.

Another object is to provide a plant moisturizing and tending device in which the component containing the water may be refilled without removing the device from the plant container.

Yet another object is to provide a plant watering device which may be secured in place adjacent and supported by an upwardly directed rim and/or pot containing structure.

Still another object is to provide a plant moisturizing device which adds minimal weight to the potted plant and which can be used on hanging plants as well as freely standing pots.

A still further object is to provide a plant watering device which includes a soil probe having a variable sized aperture therein disposed beneath the soil, with means for manually adjusting the size of aperture to vary the rate of water flow from the reservoir to the soil.

A further object is to provide a plant tending or moisturizing device wherein the filling opening is disposed within a countersunk area of the top portion and wherein the top portion includes a captive cap assembly to facilitate ready refilling and sealing.

A still further object is to provide a plant moisturizing device which is easy to manufacture, which is made from inexpensive materials, and is simple to operate and maintain.

The forgoing and other objects and advantages of the invention are achieved by providing a plant moisturizing device which includes a fluid reservoir having a body portion and a cover unit, a soil probe portion with a relatively stiff shaft and an axially extending, wick-receiving opening therein, and a soil moisturizing wick having a portion thereof lying within the reservoir and other portions extending into the opening in the probe shaft, with the shank portion of the soil probe including means defining an aperture along a portion of the shank so as to expose at least some of the wick received within the shank to the soil in which the probe is received for delivering a controlled amount of moisture to such soil.

The manner in which these objects and advantages are achieved in practice will become more clearly apparent when reference is made to the following detailed description of the preferred embodiments of the invention set forth by way of example and shown in the accompanying drawings, in which like reference numbers indicate corresponding parts throughout.

BRIEF DESCRIPTION OF THE DRAWINGS

FIG. 1 is a perspective view of one preferred form of plant watering apparatus of the invention, showing the unit in a position of use associated with a soil pot;

FIG. 2 is a top plan view of the plant watering device of FIG. 1;

FIG. 3 is a side elevational view, on an enlarged scale, of the plant watering apparatus of the invention;

FIG. 4 is a vertical sectional view of the plant watering device of the invention, taken along lines 4—4 of FIG. 2 and showing parts of the wick broken away to better illustrate operation of the variable area wick aperture feature of the device;

FIG. 5 is a fragmentary front elevational view of the soil probe portion of the apparatus, showing the operation of the variable area wick aperture; and FIG. 6 is a horizontal sectional view of the soil probe of the apparatus, taken along the lines 6—6 of FIG. 3 and showing details of construction of the soil probe unit.

DESCRIPTION OF THE PREFERRED EMBODIMENTS OF THE INVENTION

While it will be understood that the apparatus of the invention may be embodied in different forms, and that the apparatus may be constructed from different materials, a description of a form of apparatus will be made wherein the reservoir includes a body portion and a cover made from a plastic material, and wherein the probe is a tubular plastic element which includes a variable area wick aperture controlled by a slide unit.

Referring now to the drawings in greater detail, FIG. 1 shows an apparatus generally designated 10 for providing a continuous supply of a fluid such as water or other nutrient solution to potted soil in which a plant is embedded. The apparatus 10 includes a fluid reservoir generally designated 12 and shown to include side walls 14, a curvilinear inside or front wall 16, and a correspondingly contoured outside or rear wall 18. A cover unit generally designated 20 (FIG. 2) surmounts the reservoir 12 and includes a countersunk central panel 22, a captive cap unit 24 having a tether attaching the cap 24 to a rear wall 28 of the raised locking flanges 30 which form the outer margins of a major part of the cover 20. The cover 20 also includes a forwardly extending probe cover section 32 having downwardly extending side walls or flanges 34 which serve to engage and hold the upper portions of a soil probe generally designated 36.

As best shown in FIGS. 3-5, the probe 36 includes a front wall portion 38 of generally semi-cylindrical shape, an upper mounting flange portion 40, and lower, spaced apart edges 42 which partially define a variable area aperture 44 through which a lower portion 46 of the wick 48 is exposed in use. Small openings 50 extending through the front wall portion 38 of the soil probe 36 receive locking means in the form of a nose portion 52 extending upwardly from a tongue 54 formed in the upper end 56 of a slide 58 which is slidingly received within the soil probe 36. A contoured, raised finger tab 60 forms the lower end portion of the slide 58, enabling the slide to be manipulated by hand and thus reciprocated within the soil probe 36, as will be brought out in detail herein.

Referring now to the other elements of the soil probe 36, FIGS. 3-5 also show the rear wall portion 62 of the soil probe unit 36 to terminate in a pointed nose portion 64; and show the topmost portion of the rear wall 62 to comprise a shoulder 66, formed integrally with the front wall portion 16 of the reservoir 12.

FIGS. 3 and 6 show front wall portion 38 of the soil probe 36 to engage the rear wall 62 thereof, as well as a part of the shoulder 66, along a lap joint 68.

Referring again to FIG. 4, the top central portion of the reservoir front wall 16 is shown to include a wick-receiving passage 70 formed by the shoulder 66 of the probe 36 and the upper central portions of the front wall 16.

The wick 48 is shown in FIG. 4 to extend from a position adjacent the bottom wall 72 of the reservoir 12 into or adjacent the nose portion 64 of the soil probe 36, thus extending through the passage 70 where the neck or shoulder 66 of the soil probe 36 joins the front wall 16 of the reservoir 12, as well as through the axial opening 84 defined by the front and rear walls 38, 62 of the probe 36.

FIG. 4 also shows how the center panel 22 of the cover 20 is countersunk or inclines downwardly and inwardly, to join with a circular, downwardly extending central flange 74 which defines a filler opening 76 for the fluid 80 and which also snugly receives the side walls 78 of the captive cap 24.

Details of the engagement between the side walls or flanges 30, 34 on the cover 20 and the upper margins of the reservoir side walls, as well as with the flange 40 atop the front wall 38 of the soil probe 36 are also shown in FIG. 4.

Referring now to the operation of the plant watering apparatus, it will be assumed that it is desired to associate the watering or moisturizing unit 10 with a potted plant or the like for insuring that a water and/or nutrient supply to the soil surrounding the plant will be maintained at a desired level for a number of days.

First, the soil in the container adjacent one wall ("W" in FIG. 1) of the pot or other container is probed to a suitable depth, such as four to six inches, with a dowel rod, pencil, or other hole making device. Then, the unit 12 is placed in position adjacent the pot with the soil probe 36 extending into the opening thus formed, until the shoulder 66 rests on the rim of the pot, flower box, or the like. In this position, the shoulder 66 supports the weight of the apparatus, and the engagement between the soil and the probe 36 helps stabilize the unit.

It will be assumed that the tab 60 has been manipulated so as to expose a desired portion of the wick 48. Next, the cap 24 is removed from the opening 76, and water is poured therethrough from a tumbler, a pitcher, or the like. The countersunk or tapered surfaces 22 insure that any water poured in the vicinity of the top panel 26 will be directed into the opening 76, while the raised flanges 30 of the cover 20 insure that spillage during filling will be minimized or eliminated. Depending upon the desires of the user, the solution fed to the reservoir may be plain water, or water supplemented with any water soluble fertilizers, plant foods, or other additives.

After filling, the cap 24 is replaced by pressing the same into the opening 76, thus maintaining an air tight cover over the reservoir 12. Depending upon the moisture content of the soil, more or less water will be drawn by capillary action through the wick 48 from the supply of water 80 in the reservoir 12 and will pass into the soil at a rate which depends at least in part on the moisture content of the soil. Assuming that a large amount of soil is present, or that the soil is relatively dry, the slide 58 may be raised by manipulating the finger tab 60 so as to expose a greater area of wick 48. Movement of the finger tab 60 causes the nose portion 52 to ratchet upwardly or downwardly into a series of successive positions of engagement with the locking openings 50, thus preventing undesired further axial movement of the slide 58. As shown in FIG. 4, the rear inside surface 82 of the soil probe rear wall 62 may be of increased cross section towards the bottom thereof, thus reducing the cross sectional area of the axially extending opening 84 inside the soil probe 36. Consequently, downward movement of the finger tab 60 and the associated slide 58 not only exposes less of the wick to the soil, but also reduces the effective cross sectional area of the wick by squeezing it into a reduced cross section adjacent the bottom of the soil probe 36. This squeezing action also serves to compress the wick so as to reduce the rate of fluid flow therethrough.

By using the dowel rod or pencil to form the initial opening in the soil, a space is provided for the soil probe 36. Therefore, insertion thereof into the opening in the soil does not tend to move the tab 60 upwardly in relation to the probe 36. Accordingly, a predetermined adjustment of the probe can be made and the unit can be inserted without changing the adjustment. The area of the aperture 44 may be changed at any time merely by removing the device and changing the position of the finger tab 60 and its associated slide 58.

In FIGS. 1–6, a form of apparatus is shown in which the soil probe is made from two pieces snapped together along an axially extending joist 68, with one of the pieces being formed integrally with the reservoir 12. However, the soil probe 36 may also be formed as a single tubular unit and then attached to the reservoir. In such a case, a notch or cutout of suitable shape is preferably formed in the front wall 16 of the reservoir 12, in order to provide support for the probe portion and a passageway for the wick.

Plant moisturizing or plant tender devices made according to the present invention have proved to be very advantageous in use, simple to manufacture, and easy to maintain. Plant tenders in the form shown in the drawings can be molded from thermoplastic material such as polypropylene. Other materials, including plastic such as polyethylene, may also be used. The parts in question may be made by thermoforming, injection molding, or other known processes. While the exact material used or the method of making the plant tender or its element is not critical to the success of the invention, if the material selected is transparent or translucent, the user can readily determine the supply of water remaining in the reservoir by simple visual inspection.

It will thus be seen that the present invention provides a novel plant watering or tending device having a number of advantages and characteristics including those pointed out above and others which are inherent in the invention. A preferred embodiment of the invention having been described by way of illustration, it is anticipated that changes and modifications of the described plant watering and tending device will occur to those skilled in the art and that such changes and modifications may be made without departing from the spirit of the invention or the scope of the appended claims.

I claim:

1. A plant watering apparatus adapted to provide a continuous supply of water to soil within a soil and plant containing receptacle, and to be readily removable from said soil and receptacle without disturbance thereof for periodic adjustment of said apparatus to control the rate of water flowing therthrough to said soil in said receptacle, said apparatus comprising, in combination, a water reservoir portion including a reservoir body and a cover unit for said reservoir body, a soil probe unit having a probe body consisting of a straight, generally cylindrical, rigid tube having upper, lower and intermediate portions, and having the lower portion thereof closed off by a pointed nose element extending from said lower body portion along the axis of said tubular body, an axially extending, wick receiving passage forming the inner diameter of said straight, cylindrical soil probe body, a probe neck portion joined at one part thereof to said upper portion of said soil probe body and at another part thereof to an upper portion of said water reservoir, said probe neck portion also including an interior passage providing communication between the interior of said reservoir body and said passage in said probe body, said upper and intermediate portions of said probe body and said probe neck being imperforate above the level of the soil in said receptacle when said apparatus is in position of use, a wick disposed within said apparatus and extending, in position of use, from said reservoir body through said passage in said probe neck and throughout substantially the entire length of said passage in said probe body, said probe further including a generally radially outwardly facing, axially extending moisture flow opening in the lower portion thereof, and a slide unit covering part of said mositure flow opening and arranged for adjustable movement axially of said probe body between a plurality of positions, including a relatively open position and another position in which a substantial portion of said moisture flow opening is closed off, means for retaining said slide in a selected one of said plurality of positions, said generally cylindrical, axially extending, wick receiving passage includes a lower portion tapering inwardly toward the lower portion of said probe so as to form a wick receiving probe passage of a gradually reducing cross section, said tapering portion being situated in the vicinity of said moisture flow opening, whereby movement of said slide toward a closed off position of said opening tends to pinch said wick against the surface of said wick receiving passage with increasing force, thereby pinching said wick into a condition of reduced moisture flow when said slide is moved toward said position closing off said moisture flow opening, said probe neck having means forming a part thereof for support by engaging a portion of said soil and plant containing receptacle, whereby said apparatus may be repeatedly removed from and inserted into said soil and plant containing receptacle for movement of said slide unit between different positions of said adjustment to provide varying rates of water flow from said reservoir to said soil.

* * * * *